United States Patent [19]

Yamagishi et al.

[11] Patent Number: 5,766,720
[45] Date of Patent: Jun. 16, 1998

[54] IMPACT VIBRATION ABSORBERS AND DEVICES THAT INCORPORATED THEM

[75] Inventors: Masahiro Yamagishi; Hisashi Tazawa; Takehiro Hirahara, all of Shiga-ken, Japan

[73] Assignee: Toray Industries, Inc., Tokyo, Japan

[21] Appl. No.: 446,863

[22] PCT Filed: Oct. 5, 1993

[86] PCT No.: PCT/JP93/01421

§ 371 Date: Aug. 2, 1995

§ 102(e) Date: Aug. 2, 1995

[51] Int. Cl.$^6$ ............................................. B32B 3/00
[52] U.S. Cl. ................. 428/71; 428/76; 428/119; 428/120; 428/141; 428/156; 428/158; 428/304.4; 428/909
[58] Field of Search .................... 188/379, 268; 428/71, 76, 119, 120, 141, 156, 158, 159, 160, 188, 304.4, 313.5, 909

[56] References Cited

U.S. PATENT DOCUMENTS

| | | | |
|---|---|---|---|
| 3,845,827 | 11/1974 | Schulin | 173/162 |
| 4,602,549 | 7/1986 | Kumano | 84/433 |
| 4,722,946 | 2/1988 | Hostettler | 521/158 |
| 5,143,394 | 9/1992 | Piana | 280/602 |
| 5,180,147 | 1/1993 | Anderson et al. | 267/136 |

FOREIGN PATENT DOCUMENTS

| | | |
|---|---|---|
| 2-048636 | 4/1990 | Japan . |
| 91-900967 | 1/1991 | WIPO . |

OTHER PUBLICATIONS

Translation of JP 02-048636 U, Apr. 1990.

*Primary Examiner*—Marie Yamnitzky
*Attorney, Agent, or Firm*—Birch, Stewart, Kolasch & Birch, LLP

[57] ABSTRACT

An absorber of impact-caused vibrations which is excellent in absorbing impact-caused vibrations, particularly relates to vibration absorption from sports instruments, tools or bicycle associated with impact-caused vibrations, for example, with the absorber of impact-caused vibrations made of a weight and an elastomer attached to a part of devices such as grip end, absorbs impact-caused vibration energy by converting impact-caused vibrations of devices to moving energy of a weight.

4 Claims, 2 Drawing Sheets

IMPACT VIBRATION ABSORBERS AND DEVICES THAT INCORPORATED THEM

TECHNICAL FIELD

This invention relates to an absorber of impact-caused vibrations with superior impact-caused vibration absorbing performance, particularly the absorption of vibrations from devices associated with impact-caused vibrations, such as sports instrument, tools and bicycles.

BACKGROUND ART

Sports instrument subjected to impact forces include ball hitting devices such as various types of rackets, used in tennis, badminton, squash and racket ball, baseball bats and golf clubs. Tools include hammers, and bicycles include ordinary bicycles and motorcycles. Other devices associated with impact-caused vibrations include skis and fishing rods. In pursuit of such properties as being light-weight and having the ability to produce long-range shots, advances in the development of these devices have been made through changes in material from wood to metal and to composites.

However, some of these materials are associated with a variety of problems due to their low vibration absorption performance, including an uncomfortable sensation felt upon impact when hitting a ball as a result of residual vibrations and, above all, a severe shock suffered by players when the sweet spot is missed, which affects their elbows in tennis and develops into the so-called "tennis elbow" as the symptom becomes chronic. In baseball, too, batters are often subjected to severe impact forces, which render them unable to even hold the bat. The problem of vibration has also attracted attention in the areas of tools and bicycle handlebars.

Products aimed at mitigating impact-caused vibrations have been proposed and marketed, including racket "stabilizers" in tennis, which are made of rubber, hard synthetic resins, etc. and attached onto the netting to reduce its vibration. However, since they are not designed to directly absorb the impact-caused vibrations of the racket frame, they are naturally limited in their ability to alleviate the shock transmitted to the hand, although the impact sound and touch felt by the player change.

In Tokukaihei 1-262877, an invention incorporating a combination of an elastic string and a weight within the racket frame has been disclosed, and in Tokukaihei 1-288279, another invention incorporating a weight embedded in a small hole made near the grip section of a racket frame via a gel layer has been disclosed.

The former intends to transmit the vibrations of the racket frame to a weight via a fine filament-like elastic string, but it has problems in terms of its susceptibility to damage through exposure to repeated severe impacts and difficulties associated with the adjustment of the relationship between the string and weight.

The latter, on the other hand, places a gel layer and a weight in a small hole as an integrated unit, but also has problems in that it cannot absorb impact-caused vibrations on a stable basis due to the inability of its gel layer to retain the weight and the failure of the weight to stop oscillating swiftly after initial impact by responding to the reaction force to it.

DISCLOSURE OF INVENTION

This invention intends to offer absorber of impact-caused vibrations that rapidly attenuate impact-caused vibrations associated with the use of such devices as sports instrument, tools and bicycles without altering their functions or performance, and reduce uncomfortable sensations and numbness transmitted to the hand or hands after hammering, hitting, etc.

It absorbs impact-caused vibrations of the instrument body when a ball is hit by converting it to the kinetic energy of a weight by means of an impact-caused vibration absorption element consisting of the weight and an elastic body implanted into a section of the instrument such as the grip-end.

This weight works as an oscillator which develops vibration movement in response to an external impact, and its function as such an oscillator has been enhanced by embedding it in an elastic body.

The absorption of impact-caused vibrations for actual sports instrument is achieved effectively by implanting the absorber of this invention into a section of the instrument, especially the grip-end.

The weight used in the absorber of this invention can be made of any material, such as lead, iron, copper or ceramics, as long as it can function as a weight, and there are no particular restrictions in this regard. However, due to limited mounting space, heavy materials, preferably 7 or more in specific gravity, are desirable, and among them lead, with its wide availability and inexpensiveness, is preferable.

Although it depends on its volume, the desirable overall weight of the weight used in the absorber of this invention is in the 1–20 g range, or more specifically in the 3–15 g range, for if it is too light, vibration attenuation performance decreases, whereas if it is too heavy, it undermines the weight reduction effort aimed at the instrument as a whole or upsets the overall weight balance, thus leading to undesirable results.

A wide variety of elastic materials can be used as the elastic body of the absorber of this invention, including natural rubbers and synthetic resins, such as polyvinyl chlorides, polyurethanes, polyamides, polystyrenes, copolymerized polyvinyl chlorides and polyolefine synthetic rubbers, as well as synthetic rubbers, such as EPDM, styrene-butadiene rubbers, nitrites, isoprenes, chloroprenes, propylenes and silicones.

These materials can be either a foam or knobbed elastic sheet. Materials which exhibit three-dimensional elasticity are preferable, and examples of desirable materials include foamed elastic bodies, knobbed elastic bodies and combinations of these, which all have excellent impact-caused vibration developing performance.

These elastic bodies can be used selectively according to the magnitude of the impact force involved. With sports involving relatively small impact forces, such as badminton and table tennis, a foamed elastic body alone can provide sufficient effectiveness, and with sports involving medium-level impact forces, such as tennis, squash and golf a dual structure of foam and knobbed sheet is desirable, whereas those involving large impact forces, such as baseball, tend to require an elastic body based entirely on knobbed body. Even with these elastic bodies, however, effectiveness disappears when impact forces are extremely large, causing the weight to hit the bases of the elastic body. In such cases, the adoption of a structure incorporating a protective feature for a knobbed elastic body to prevent this phenomenon or that based on a densely constructed knobbed elastic body is desirable.

It is desirable that the elastic material to be used as the knobbed elastic body exhibits a stress value of some 0.5–200 kg/cm² at a 50% elongation. Although the shape of the knob of the elastic body concerned can vary, including circular column, square rod, circular cone and prismoid, its size is determined according to mounting space restrictions, etc., for example within the range of 0.5–5 mm in base circle diameter and 0.5–10 mm in knob height in the case of a circular column. The desirable knob density is 5–80% in terms of area occupation ratio. If this is less than 5%, elasticity will be too great, leading to a reduced weight retaining ability, whereas if it is more than 80%, elasticity will be too small, restricting the movement of the weight, and thus resulting in a reduced vibration absorption effect. In the case of prismoid knobs, the density can be 100% on one side, and the material can be used by adjusting its size, as long as the tops can hold the weight.

The desirable range of the rebounding force exhibited by foamed bodies of the absorber of this invention is some 3–300 g/cm² at a 25% compression, and it is preferable to use low and high rebounding force materials for instrument involving low and high impact forces, respectively.

FIG. 1 shows weights used in the absorber of this invention, which come in various shapes, including sphere, circular column, cube and square rod, marked (a), (b), (c) and (d), respectively. FIG. 2 shows examples of knobbed elastic bodies, with (a), (b) and (c) being circular column, circular cone and prismoid, respectively. FIG. 3 shows an example of an absorber of impact-caused vibrations used in this invention, consisting of a foamed elastic body and weight, marked "1" and "2", respectively. FIG. 4 is a second example of an absorber of impact-caused vibrations used in this invention, which comprises a weight, marked "2", and a knobbed elastic body, marked "3", "4" and "5", arranged to completely embrace the weight. FIG. 5 shows a third example of an absorber of impact-caused vibrations used in this invention, which comprises a weight, marked "2", a foamed elastic body, marked "1", "6" and "7", and knobbed elastic body, marked "3", which together embrace the weight.

FIG. 6 shows a typical mounting method for absorber of impact-caused vibrations used in this invention, where an absorber of impact-caused vibrations (FIG. 3–5) is placed and fixed within a mounting space, marked "8", created in the grip-end of sports instrument, such as a tennis racket or golf club, and bicycle handlebar, by the grip-end shaft reinforcement, marked "9", and cap, marked "10". The grip-end surface is usually covered with leather tape, marked "11".

Notations:
1: Foamed elastic body
2: Weight
3: Knobbed elastic body
4: Knobbed elastic body (top plate)
5: Knobbed elastic body (bottom plate)
6: Foamed elastic body (top plate)
7: Foamed elastic body (bottom plate)
8: Grip-end space
9: Shaft reinforcement
10: Cap
11: Leather tape

BEST MODE FOR CARRYING OUT THE INVENTION

Although further explanation of the invention will be given in a more concrete manner with the use of working examples, these should not in any way be used to limit the interpretation of this invention.

EXAMPLE 1

Figure 3:
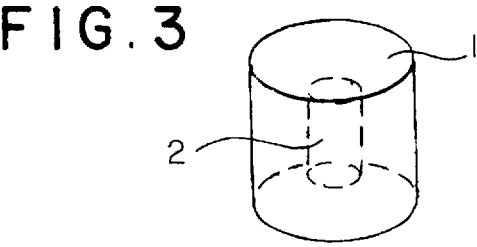
FIG. 3 A drawing showing an example of the construction of an absorber of impact-caused vibrations used in this invention. In this example, the weight is embedded in a foamed elastic body and mounted onto the inside of the grip wall.

An absorber of impact-caused vibrations with the construction shown in FIG. 3 was produced by embedding a weight made of 2 g lead, marked "2", in a foamed silicone resin, marked "1".

The absorber of impact-caused vibrations was mounted into the grip-end of a tennis racket and vibration characteristics were measured.

The measurement was carried out by hitting the frame top of a hanged racket with a hammer, detecting the transmitted vibrations by a pickup set near the middle section of the grip, and calculating the vibration loss coefficient, η.

The results show that the racket in this working example exhibited h=0.071, compared to 0.006 for one without, which was tested for comparison purposes.

EXAMPLE 2

Figure 5:
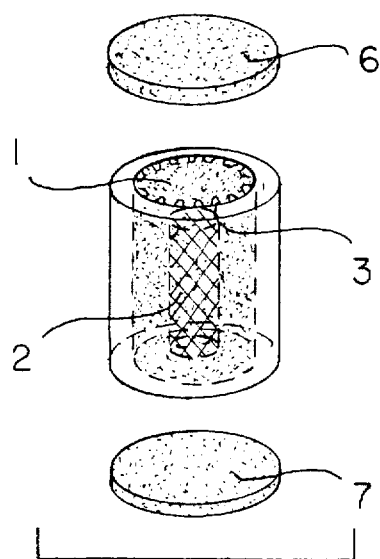
FIG. 5 A drawing showing an example of the construction of an absorber of impact-caused vibrations used in this invention. In this example, a complex structure that combines the two schemes shown in FIGS. 3 and 4 is mounted onto the inside of the grip wall.
Figure 6:
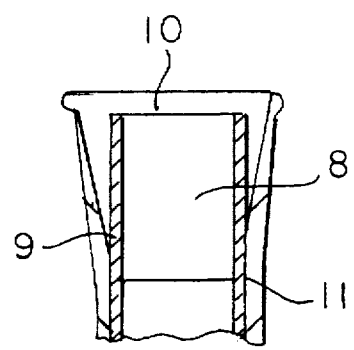
FIG. 6 A drawing showing an example of the cross section of the grip-end of a racket.

An absorber of impact-caused vibrations with the construction shown in FIG. 5 was produced by embedding a weight made of 5 g lead, marked "2", in a knobbed elastic body with circular column knobs measuring 1 mm in base circle diameter and 1 mm in height and having a knob density of 25 knobs/cm², i.e. a 20% area occupation ratio, marked "3", and a foamed polyurethane elastic body with a 20 g/cm² repulsive force at a 25% compression, marked "1", "6" and "7".

This absorber of impact-caused vibrations was mounted into the grip-end of a tennis racket and compared with one without it.

The results show that the racket in this working example exhibited h=0.011, compared to 0.007 for one without, which was tested for comparison purposes.

These rackets were tried by actually hitting a tennis ball with them. The results show that the racket in working example 2 exhibited a good impact touch, with only a little vibration felt even when the sweet spot was missed, thus enabling a follow-through, and a clear difference compared to the reference racket was observed.

EXAMPLE 3

Figure 1A:
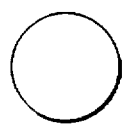
FIGS. 1(a), (b), (c) and (d) are drawings showing schematized representations of possible shapes of a weight used in the absorber of this invention.
Figure 1B:
Figure 1C:
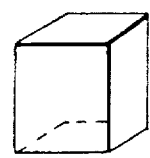
Figure 1D:
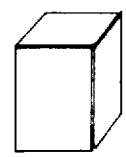
Figure 2A:
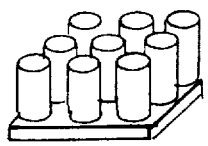
FIGS. 2(a), (b), (c) and (d) are drawings showing schematized representations of possible shapes of the knobbed elastic body used in the absorber of this invention.
Figure 2B:
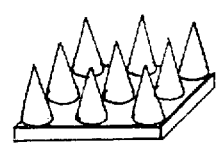
Figure 2C:
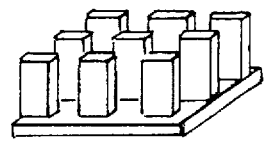
Figure 2D:
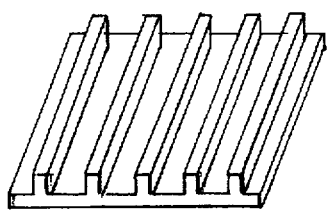
Figure 4:
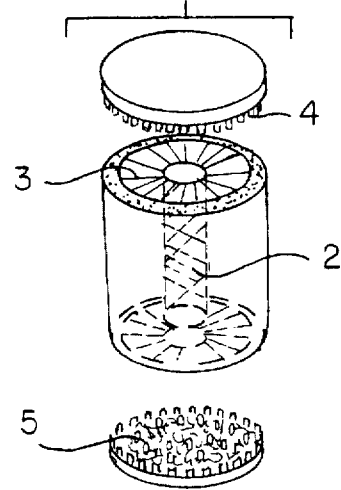
FIG. 4 A drawing showing an example of the construction of an absorber of impact-caused vibrations used in this invention. In this example, the weight is embedded in a knobbed elastic body and mounted onto the inside of the grip wall.

An absorber of impact-caused vibrations with the construction shown in FIG. 4 was produced.

In this example, a knobbed elastic body made of vulcanized natural rubber with circular column knobs measuring 2 mm in base circle diameter and 5 mm in height and having a knob density of 9 knobs/cm$^2$ was used, marked "3", "4" and "5", along with a weight made of 12 g lead, marked "2".

This absorber of impact-caused vibrations was mounted into the grip-end of a baseball bat. This baseball bat exhibited an excellent impact-caused vibration reduction performance, where impact-caused vibrations was dramatically reduced even at times of imperfect batting. It had a markedly high vibration loss coefficient of 0.03, compared to 0.002 for one without the absorber of impact-caused vibrations.

INDUSTRIAL APPLICABILITY

Goods such as sports instrument, tools and bicycles incorporating an absorber of impact-caused vibrations of this invention, typically mounted into the grip-end, can reduce uncomfortable sensations and numbness and ensure a pleasant play or ride by rapidly attenuating impact-caused vibrations generated upon hammering or hitting a ball, or during a ride.

We claim:

1. An absorber of impact-caused vibrations, comprising a foamed elastic body and a knobbed elastic body, wherein the absorber has a weight retained therein, and wherein the absorber possesses an arrangement wherein said knobbed elastic body surrounds and encloses said foamed elastic body with its knobs facing inward.

2. The absorber of impact-caused vibrations as described in claim 1, wherein said foamed elastic body possesses a rebounding force at 25% compression of 3–300 g/cm$^2$.

3. The absorber of impact-caused vibrations as described in claim 1, wherein said knobbed elastic body possesses a stress value at 50% elongation of 0.5–200 kg/cm$^2$.

4. The absorber of impact-caused vibrations as described in claim 1, wherein the weight weighs 3–15 g.

* * * * *